March 5, 1963 J. DIAZ 3,080,035
CHANGE-MAKING MACHINE
Filed Jan. 29, 1959 10 Sheets-Sheet 1

FIG. 1

INVENTOR.
Juan Diaz
BY
Ooms, McDougall, Williams & Hersh
Attorneys

FIG. 3

INVENTOR.
Juan Diaz

March 5, 1963

J. DIAZ 3,080,035

CHANGE-MAKING MACHINE

Filed Jan. 29, 1959

INVENTOR.
Juan Diaz
By
Toms, McDougall,
Williams & Hersh
Attorneys

March 5, 1963 J. DIAZ 3,080,035

CHANGE-MAKING MACHINE

Filed Jan. 29, 1959 10 Sheets-Sheet 5

INVENTOR.
Juan Diaz

March 5, 1963  J. DIAZ  3,080,035
CHANGE-MAKING MACHINE
Filed Jan. 29, 1959  10 Sheets-Sheet 10

INVENTOR.
Juan Diaz
BY
Ooms, McDougall, Williams & Hersh
Attorneys

United States Patent Office 3,080,035
Patented Mar. 5, 1963

3,080,035
CHANGE-MAKING MACHINE
Juan Diaz, Chicago, Ill., assignor, by mesne assignments, to Automatic Canteen Company of America, Chicago, Ill., a corporation of Delaware
Filed Jan. 29, 1959, Ser. No. 789,870
8 Claims. (Cl. 194—4)

This invention relates to a changer and, more particularly, to an automatic change-making machine for use in combination with a plurality of vending units.

Some of the obstacles to the more widespread acceptance of vending machines for the sale of products have arisen from problems connected with the acceptance of larger sums of money and the return of change corresponding to the differences between the price of the products purchased from the machine and the money inserted therein for purchase. Simple vending machines which function on a single product or in a number of products salable at a single price are becoming obsolete as the use of vending machines is expanded to different types of products having different and various prices. Some vending machines designed for receipt of a fixed sum of money for purchase have overcome the problems by including the change to be returned as a part of the package that is dispensed, as in certain cigarette vending machines. Other machines, as represented by soft drink, coffee, hot chocolate and the like machines embody a little more flexibility in that they can be designed to receive money in denominations of 5, 10 or 25-cent pieces for return of change in corresponding denominations. Such machines have a number of disadvantages, particularly when price changes occur in the merchandise and especially when the price change is other than a simple increment of 5 cents. The need is for an automatic change-making machine capable of use in combinations with one or a plurality of vending machines for making change automatically in response to the price of the product or products vended and the money that is inserted into the machine for purchase, and which embodies changes in price to be effected in a simple and efficient manner.

It is apparent that the design of such change-making machine would be complicated and perhaps economically impractical unless designed for vending machines adapted to receive a fixed sum of money for operation such that the making of change would merely constitute the difference between the fixed sum of money received and the price of the article that is dispensed. It would be desirable, and therefore is a principal object of this invention, to produce an automatic change-making machine which is capable of making change in any amount and which is designed for use with vending machines which operate in response to the insertion of money in various amounts for purchase of articles capable of being vended.

The need for an automatic change-making machine of the type described has increased materially through the recent development of practical dollar bill-acceptance units. With such a device, vending machines can be designed to accept payments in paper money so that a much wider and more expensive class of merchandise can be dispensed through such machines. It is desirable, therefore, and another principal object of this invention, to produce a machine of the type described which operates automatically to return the correct change responsive to the operation of a vending machine and which is capable of operation in response to payment with paper currency.

In an installation, large numbers of vending units or machines may be joined into a common group or bank. Each may be designed to dispense different products at different prices. In such installation, it would be undesirable to provide a separate coin or money-receiving unit and change-making unit for each vending unit. Thus it is a further object of this invention to provide a common money-acceptance and change-making machine capable of use with a large number of such vending units for selling or dispensing different products at different prices, and wherein prices can be changed in a simple and efficient manner. It is desirable to provide a change-making machine which operates automatically and which can be adjusted in a simple and efficient manner to change the amount of money returned as changes occur in the price or prices of the articles being vended.

When a single change-making device of the type described is employed with a large number of vending units, it may be expected that its supply of money for change may become exhausted in short order. On such occasion, the combination becomes inactivated until the supply of change has been replenished. It is an important concept of this invention to provide a machine of the type described in which the supply of money for change can be easily and quickly replenished.

These and many other objects and advantages of this invention will hereinafter appear and for purposes of illustration, but not of limitation, an embodiment of the invention is shown in the accompanying drawings, in which.

Figure 1:
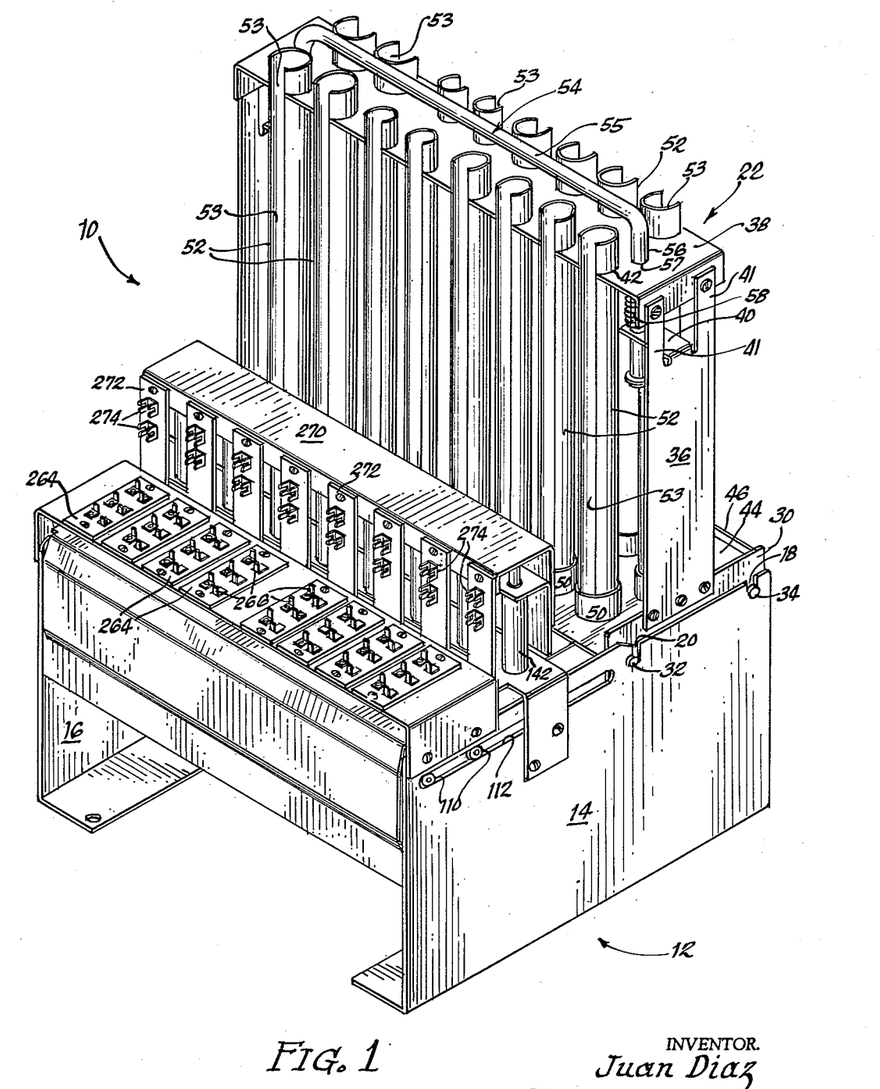
FIGURE 1 is a perspective view of the support for the mechanical parts of the change-making machine and showing the detachable change tube assembly mounted thereon, but with the wire connections omitted.

Referring now to FIG. 1 of the drawing, the mechanical part of the change-making machine for use with a bank of vending machines, and indicated generally by the reference numeral 10, comprises a support 12 formed from spaced parallel vertical support plates 14 and 16. The upper edges of the support plates 14 and 16 are provided with pin-receiving grooves 18 and 20.

Figure 3:
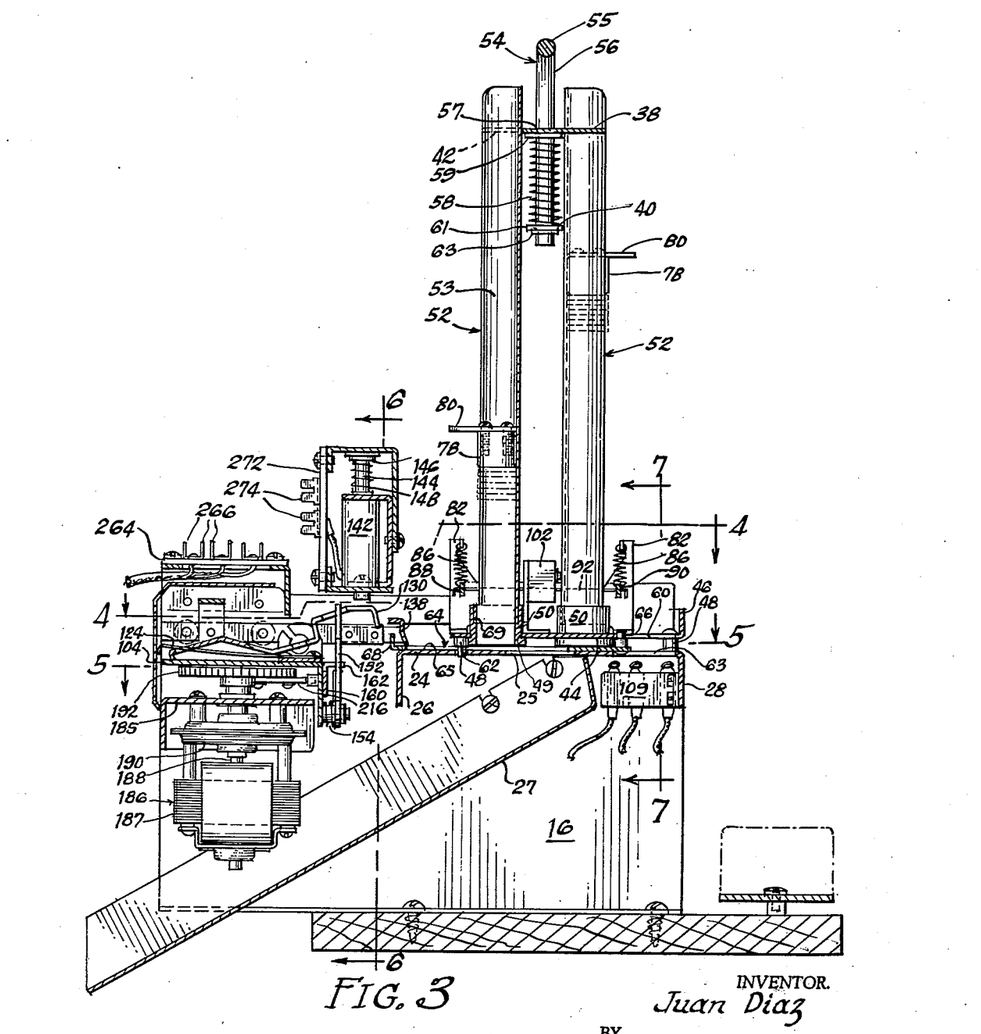
FIG. 3 is a sectional view taken on the line 3—3 of FIG. 2.

A coin tube assembly, indicated generally by the reference numeral 22, is designed to be removably secured to the support 12. As seen in FIG. 3, this coin tube assembly comprises a first or lower base member 24 having downwardly bent front and rear flanges 26 and 28, and upwardly bent side flanges 30, see FIG. 1. Pins 32 and 34 extend out transversely from the side flanges 30, and these pins are adapted to enter the pin-receiving grooves 18 and 20, to removably support the coin tube assembly 22 on the support 12. In addition, the base member 24 is provided with a plurality of coin exit openings 25 disposed between the front and rear flanges 26 and 28, see FIGS. 3 and 5. These exit openings are directly above a downwardly inclined coin exit chute 27 which is attached to the support plates 14 and 16 by any conventional means, such as screws.

The coin tube assembly 22 includes vertical side support members 36. These support members are secured at their lower ends to the side flanges 30 and at their upper ends to a horizontal support plate 38, by any conventional means. In the embodiment shown, screws were used for ease of assembly. As seen, the upper end of each side member 36 is forked, and the central portion 40 between the tines 41 of the fork is bent transversely to form a handle support. The front and rear edge portions of the horizontal support plate 38 are provided with coin tube-receiving recesses 42, and these recesses are disposed in two spaced parallel rows.

Figure 4:
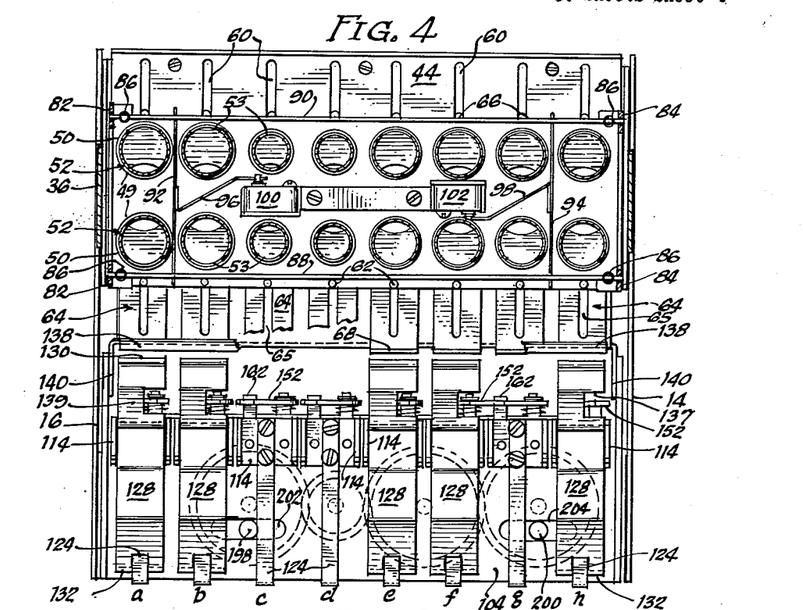
FIG. 4 is a sectional view taken on the line 4—4 of FIG. 3.
Figure 9:
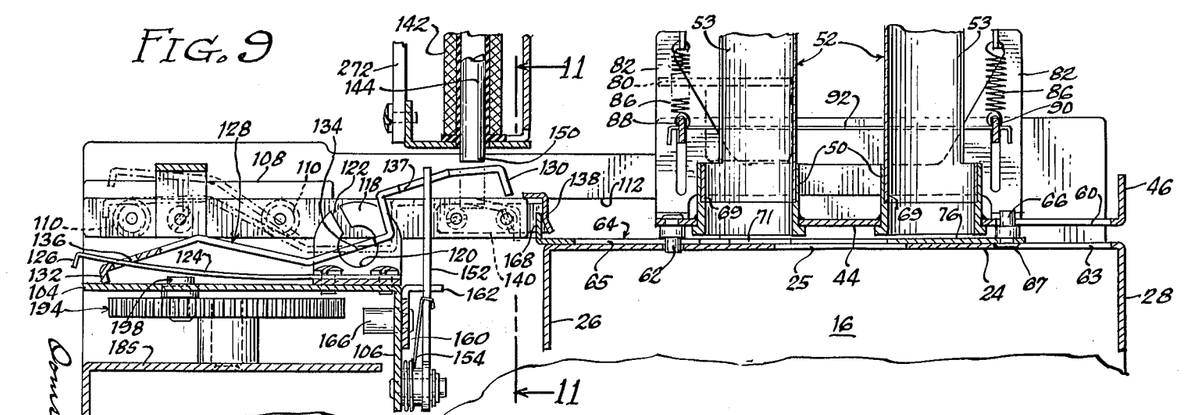
FIG. 9 is an enlarged side view partly in section of the pushing lever mounted on the sliding main plate, but before the pushing lever has been engaged by the push rod of the actuating solenoid.

A second or upper base member 44 having a rear upwardly bent flange 46 is mounted on base member 24 and is held in spaced parallel relation thereto by means of screws and spacer members 48, see FIGS. 3 and 4. This base member is provided with two rows of openings 49 which in assembled relation are aligned with the recesses 42 in support plate 38. Upwardly projecting cylindrical sockets 50, open at both ends, are mounted in these openings 49 by any conventional means. These sockets are adapted to receive the lower end of the coin tubes 52. The coin tubes are open at both ends, and as seen in FIG. 9, their lower ends 69 are inserted in sockets 50, while their upper ends are mounted in recesses 42 to form two spaced parallel rows of coin tubes. It is also seen that the columns of coin tubes formed by these parallel rows are parallel to each other. Since the various coin tubes are designed to receive coins of different denominations and sizes, the size of the recesses 42 and the sockets may vary accordingly. Alternatively, inserts may be provided for the coin tubes so they all have the same external dimensions, but are adapted to retain different size coins. The coin tubes in the same column will generally hold the same denomination coin, except as will be described below. As seen, the coin tubes 52 are provided with slots 53 extending along their length. The width of these slots is large enough so that fingers or tools can be inserted therein for convenient insertion and removal of the coins.

A handle 54 formed from a bar includes a central horizontal portion 55 and transverse downwardly extending end or leg portions 56. The handle is mounted on the coin tube assembly 22 with the leg portions 56 extending through openings 57 on each end of the horizontal support member 38, see FIG. 3. A collar 59 is rigidly secured to each leg 56 just below the horizontal support member. Each leg extends through a coil spring 58 and penetrates an opening 61 in support 40. As seen, one end of each coil spring bears against a collar 59 and the other end bears against support 40. This acts to bias the handle in the upward direction, as shown in FIGS. 1 and 3. To limit the upward movement of the handle due to the effect of springs 58, an additional limit collar 63 is secured to each leg 56 just below support 40, as shown.

With this arrangement, the handle 54 is resiliently and reciprocably mounted on the support plate 38, and is spring urged upwardly. This permits the coin tube assembly to be mounted in a cabinet where the top of the cabinet is flush with the top edge of the coin tubes 52, thus eliminating space which would otherwise be wasted by the handle if it projected above the top of the coin tubes at all times, see FIG. 19.

Figure 2:
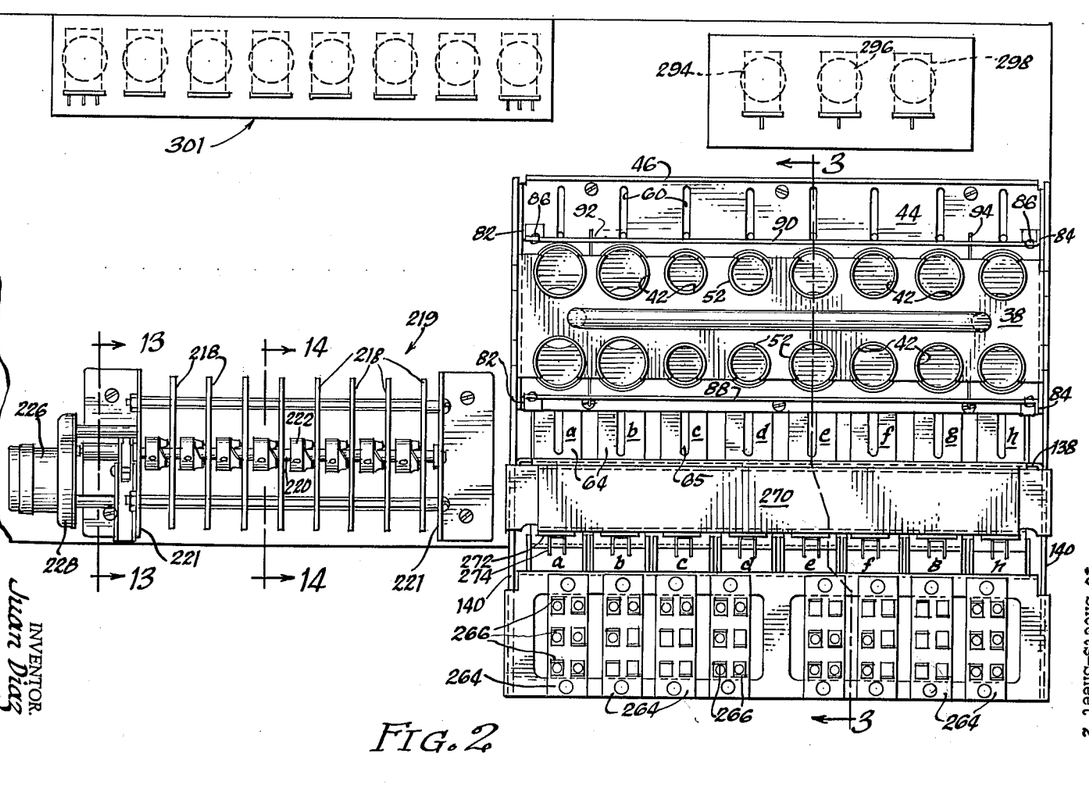
FIG. 2 is a plan view of the assembly shown in FIG. 1 and showing in addition one arrangement of the associated relay switches and the printed circuit assembly.

As seen in FIGS. 2 and 4, the rear portion of the upper base plate 44 is provided with spaced parallel slots 60. These slots are parallel to and coextensive with spaced parallel slots 63 formed in the rear of the base plate 24, see FIGS. 3 and 5. In line with each slot 60, and extending downwardly from the front portion of the base plate 44, is a guide pin 62, see FIGS. 9 and 10. A plurality of coin slides 64 are provided. Each coin slide has a slot 65 at the front end for guidably receiving one of the guide pins 62, see FIG. 5. The rear end of each of the coin slides is provided with a pin 66 which is secured to the coin slide 64 by means of a rivet 67, see FIG. 10. This pin extends upwardly and penetrates slot 60, see FIG. 9. The coin slides 64 are all mounted between the upper and lower base plates 24 and 44 in spaced parallel relation to each other with each pin 66 sliding in a guide slot 60, with the head of each rivet 67 sliding in a guide slot 63 and with each pin 62 sliding in a guide slot 65. This arrangement permits the coin slides 64 to move back and forth in a straight line between the upper and lower base plates 24 and 44.

The front end of each coin slide is bent upwardly to form a flange 68 for engagement with the pushing lever and a rake on the sliding main plate, as described below. Slot 65 in the front portion of each coin slide 64 communicates with two enlarged and connected generally annular coin-receiving openings 70 and 72, see FIG. 5. Portions 74 and 76 on each side of openings 70 and 72 of the coin slide act as closure members, as described below.

Figure 5:
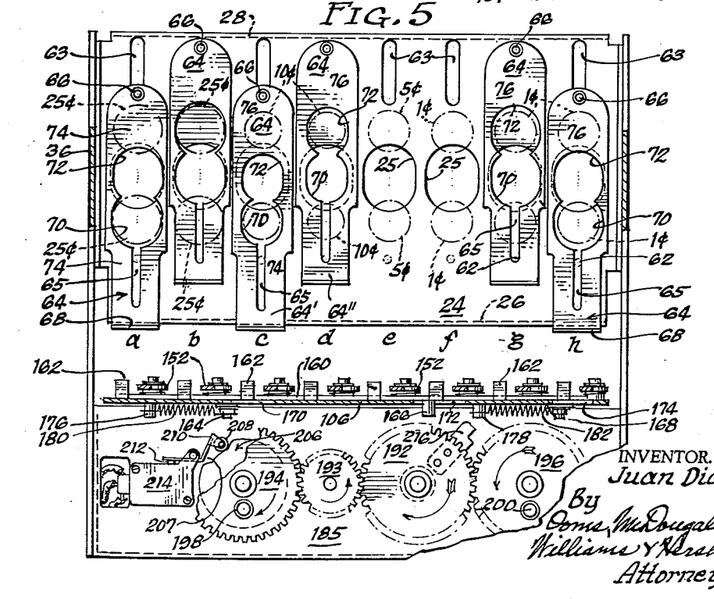
FIG. 5 is a sectional view taken on the line 5—5 of FIG. 3.

The operation of these coin slides can be seen by comparing the position of coin slide 64' and coin slide 64" in FIG. 5. As seen, each coin slide is movable between two operative positions beneath a particular column of coin tubes. In the first position, as exemplified by coin slide 64', opening 70 is aligned with the bottom of a coin tube 52 in the front row of the column. In this position, a coin 71 in the coin tube will fall out of the bottom of the tube and onto the first base member 24. When the coin slide 64 is advanced to the second position, as seen by the position of coin slide 64", the coin 71 resting on the base member 24 and in opening 70 of coin slide 64' will be pushed along with the coin slide 64 until it falls out of opening 25 in base member 24 which lies along its path, see FIG. 10. In this second position, opening 72 in coin slide 64 will be aligned with a coin tube 52 in the rear row of the column, so that a coin 71 which was initially held in that coin tube by the closure member 76 will be free to fall out of the coin tube in the second row onto the base member 24. This coin will project up into the opening 72 in the coin slide 64. At the same time, closure member 74 on the coin slide 64 has moved to close off the bottom of the coin tube 52 in the first row, see coin slide 64". Then if the coin slide is moved back to its initial position, the coin on base member 24 and in the opening 72 will be pushed along with the coin slide until it falls out of the opening 25 in base member 24. With the arrangement described, it is evident that if a coin slide is moved through a complete cycle, i.e., from its first position to its second position, and then back to its first position, one or two coins will be ejected through the coin chute 27, depending on whether one or both of the coin tubes in the associated column have coins in them.

It is understood that the coin tubes in each column are mounted so the horizontal base member 24 is positioned below the lower ends of the coin tubes by a distance less than twice the thickness of the denomination coin carried by the coin tubes, so that no more than one coin at a time can fall out of each coin tube in a column as its associated coin slide moves through its cycle.

Figure 17:
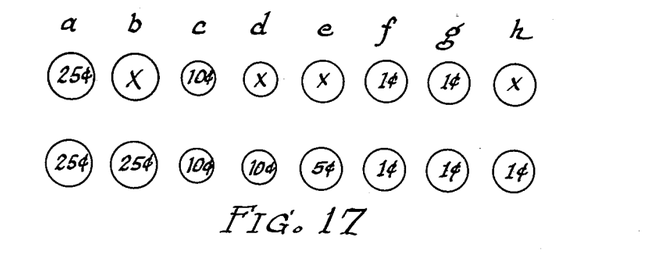
FIG. 17 shows one practical arrangement of the coins in the coin tube assembly.

As seen in FIGS. 1 and 17, there are 8 columns of coin tubes in this particular embodiment, and there are two coin tubes in each column. These columns are indicated by the symbols $a$, $b$, $c$, $d$, $e$, $f$, $g$, and $h$. It is to be understood, however as will become later more apparent that the device can have more columns of coin tubes. In the example shown in FIG. 17 both coin tubes in column $a$ are filled with quarters, so that when the coin slide 64 associated with this column moves through a complete cycle, two quarters will be dispensed from the machine. Column $b$, adjacent column $a$, has quarters in only one coin tube so that for each movement of its coin slide through a cycle, only one quarter will be dispensed from the machine. The coin tube arrangement shown in FIG. 17 permits any sum of money, up to one dollar, to be returned by actuating a maximum of five coin slides through one complete cycle. For example, to return 57¢ in change, coin slide $a$, associated with coin tube column $a$, would be actuated through a cycle causing two quarters to be dispensed. In addition, coin slide $e$, associated with coin tube column $e$, would be moved through a complete cycle, causing a nickel to be dispensed. Finally, coin slides $f$ or $g$, associated with the proper coin tube columns, would be moved through a complete cycle, causing another two cents to be returned. The symbols associating the coin slides with the columns of coin tubes are shown in FIG. 5.

Figure 19:
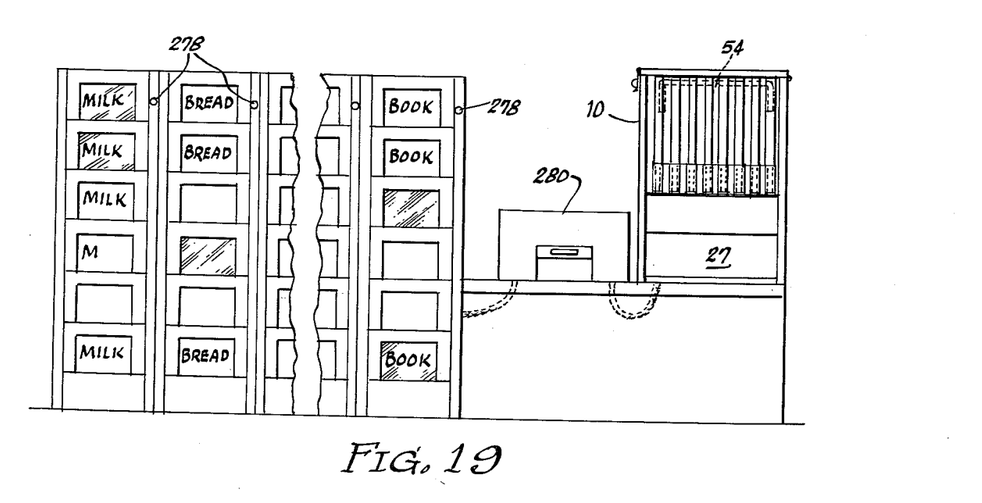
FIG. 19 shows a bank of vending machines in combination with a dollar bill-acceptor and the change-making machine.

As will be described below, vending machines associated with the change-making machine described in this particular embodiment, are designed to receive payment only in a single dollar bill, see FIG. 19, and the mechanism described below is connected to the coin tube assembly to actuate certain of the coin slides therein on the basis that a dollar has been inserted in the machine. For example, suppose a dollar is inserted in the machine for merchandise to be sold for 43¢. The change for this is 57¢, so that the machine must move coin slides $a$, $e$, and $f$ or $g$ through their cycle, as described above. Similarly, for merchandise selling for 1¢, 99¢ must be returned, and this requires coin slides $a$, $b$, $c$, $f$, and $g$ to be moved through their cycle.

It is necessary to provide means for cutting off the entire system, including the vending machines, when the supply of coins in the change tubes becomes exhausted. This has been done by inserting a weight member 78 of proper size on the top of each stack of coins in the proper coin tubes, see FIG. 3. An arm 80 is secured to the top of this weight member by any convenient means, and this arm projects out of the coin tubes through the slot 53. It is apparent that as the coins in each coin tube are dispensed, the weight and its arm will gradually move downward.

Figure 7:
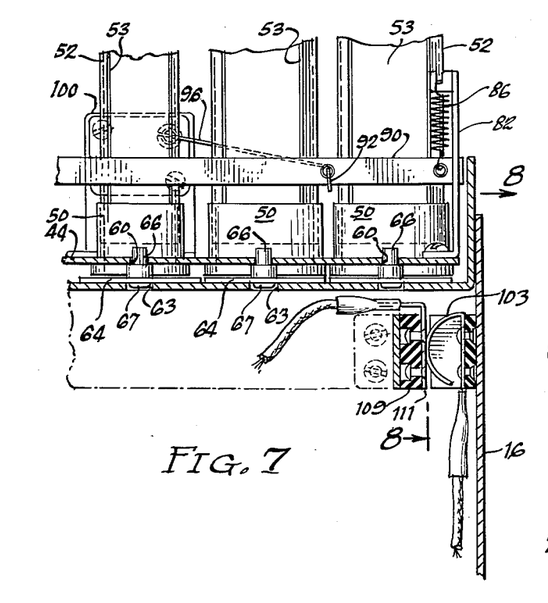
FIG. 7 is a sectional view taken on the line 7—7 of FIG. 3.

As seen in FIGS. 2 and 7, two pairs of vertically upstanding support members 82 and 84 are mounted on each side of the base member 44. A coil spring 86 is connected at one end to the top of each of these support members and at the other end to one of two horizontal switch bars 88 and 90, see FIG. 3. This resiliently mounts these switch bars on base member 44. As seen in FIG. 3, these switch bars are in the path of arms 80 extending out from the coin tubes. When the coins in a coin tube are exhausted, arm 80 moving downward will engage one of the switch bars and will force it down against the resilience of springs 86.

The bars 88 and 90 are connected together by means of connecting arms 92 and 94, see FIG. 4, so that when one end of bar 88 is deflected, the corresponding end of bar 90 will be deflected. The arms 96 and 98 of the single-pole, double-throw switches 100 and 102 are secured to the central portion of the connecting arms as shown, so that when any portion of these bars is depressed, the contacts on at least one of the microswitches will be changed. These microswitches act as a part of an empty indicator, and as described below, cut off the change-making machine and the vending machines when the supply of coins in any of the coin tubes which are supposed to carry coins is exhausted. In this particular embodiment, the length of the bars 88 and 90 have made the use of two microswitches necessary to make certain that when any one of the coins in any tube is exhausted, the depression of the switch bars will be sufficient to actuate the microswitch 100 or 102. It is apparent, however, that other arrangements employing only one microswitch are possible and are contemplated, and the claims should be construed accordingly.

As stated above, and as seen in FIG. 1 of the drawing, the coin tube assembly 22 is designed to be easily removed from the change-making machine when the supply of change is exhausted, so that another coin tube assembly, filled with change, can be immediately substituted for it. This procedure eliminates a time delay, and consequently some lost business, which could occur, because the vending machines have to be shut off until the change-making machine is again loaded with change. Meanwhile, the removed and exhausted coin tube assembly can be re-supplied with change at a more convenient time and place.

This involves an additional consideration because the microswitches 100 and 102 are mounted on each coin tube assembly and they are electrically connected to the control circuit to indicate when the change in the machine has become exhausted. Consequently, it is necessary to disconnect these switches from the control circuit of the change-making machine when one coin tube assembly is removed, and it is necessary to reconnect the corresponding switches on the loaded coin tube assembly which is substituted for the exhausted coin tube assembly. Since speed and ease are very important, these connections have been made automatic.

Figure 8:
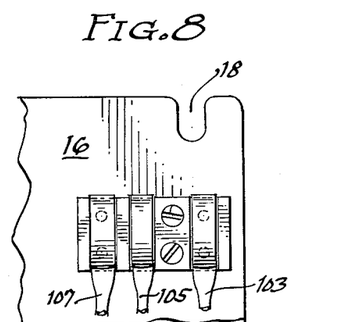
FIG. 8 is a sectional view taken on the line 8—8 of FIG. 7.

As seen in FIGS. 7 and 8, three spaced parallel arcuate side contacts 103, 105, and 107, are permanently mounted on the side 14 of the support 12. Wires lead from these contacts to the control circuit as described below. A terminal block 109 having three spaced parallel coin tube contacts or terminals 111 fixed thereon is secured to each coin tube assembly. Terminals 111 are permanently connected to the microswitches 100 and 102 on each coin tube assembly. As seen, the location of the terminal block 109 and the spacing of the terminals 111 thereon is such that when any coin tube assembly 22 is mounted on the support 12, terminals 111 automatically engage contacts 103, 105 and 107, and thereby automatically connect the switches 100 and 102 on each coin tube assembly to the control circuit.

Figure 10:
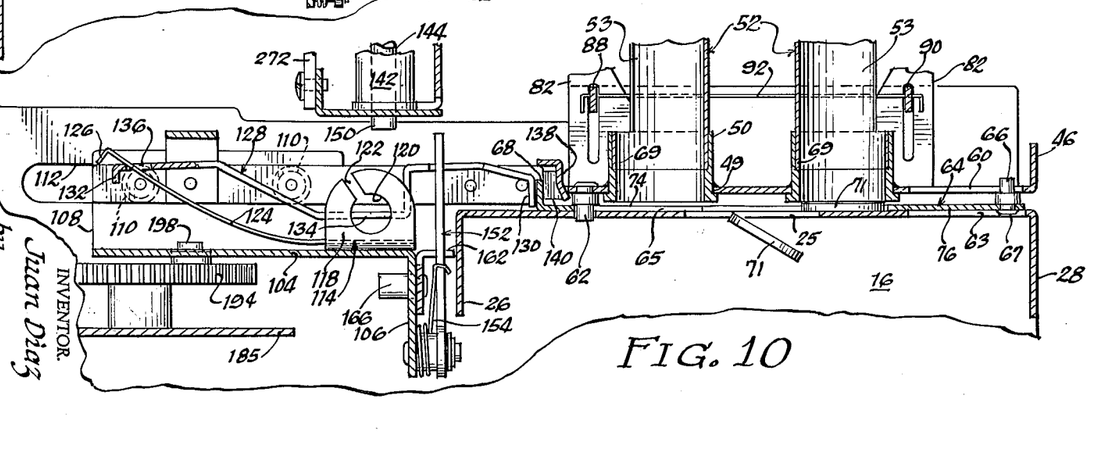
FIG. 10 is a side view partly in section of the pushing lever on the sliding main plate after the main plate has been shifted, and after engagement of the pushing lever by the actuating solenoid, and after engagement of the coin slide by the pushing lever.

The mechanism for actuating the coin slides for returning the change, in this particular embodiment, consists of a horizontal sliding main plate 104. This main plate has a depending rear support flange 106 and upwardly extending side flanges 108, see FIGS. 9, 10, and 11. Horizontally spaced bearing members 110 are secured to the side flanges 108 by any conventional means, and these bearing members ride inside a slot 112 formed in the upper portion of the side flanges 14 and 16, see FIGS. 1 and 11. This permits the sliding main plate 104 to be horizontally displaced with the bearing members 110 riding in the guide slots 112. As seen in FIGS. 9 and 10, the first and second positions of the sliding main plate are defined by the limits of the slots 112.

Figure 12:
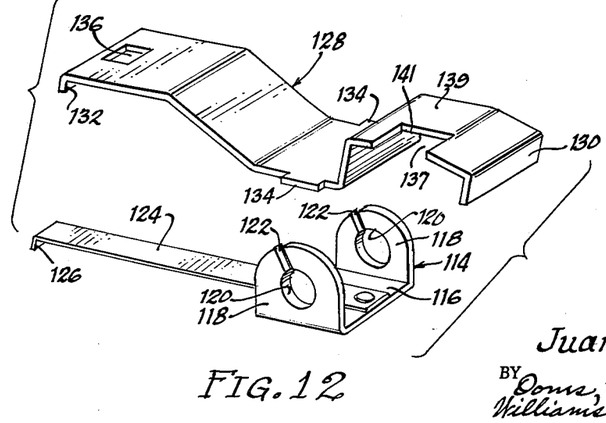
FIG. 12 is a perspective exploded view of the pushing lever and its bracket.

A plurality of brackets 114, one for each coin slide, are provided, see FIG. 12. These brackets include a web portion 116 and upwardly bent side flanges 118. The upper peripheral edges of the side flanges 118 are rounded, as shown, but this is not essential and other shapes may be used. Each side flange includes a central bearing receiving opening 120. A slot 122 extends from the rounded peripheral edge of these side flanges and communicates with opening 120. As seen, the slots 122 on the side flanges 118 are parallel to each other. Each bracket member is further provided with an elongated leaf spring 124. This leaf spring is secured at one end to the web 116 of the bracket 114, while the other end terminates in a downwardly extending flange 126.

Each bracket 114 is designed to pivotally support a pushing lever, indicated generally by the reference numeral 128. The pushing lever has a longitudinal cross-section as shown in FIG. 12, and in particular includes a rear pushing flange 130 and a front downwardly extending spacing flange 132. Additionally, the pushing lever is provided with flat sidewardly extending bearing members 134. The width of these flat bearing members is a little less than the diameter of openings 120, so that when the pushing lever 128 is mounted on the bracket 114, these bearing members will project inside the opening 128 and will permit the pushing lever to pivot in the bracket as shown in FIGS. 9 and 10.

The flat shape of the bearing members 134 is very useful because the pushing levers 128 can be easily and removably mounted on the brackets 114 by simply inserting the bearings 134 endwise through the slots 122, until they reach the openings 120.

As seen in FIG. 12, the front portion of the pushing lever 128 is provided with an opening 136 centrally disposed between the sides. The front portion of the leaf spring 124 adjacent flange 126 is designed to extend through this opening to bias the pushing lever 128 so its front portion adjacent flange 132 is down and its rear portion adjacent flange 130 is up, see FIG. 9. The flange 126 formed on the leaf spring 124 is designed to engage the front of the pushing lever adjacent flange 132 to prevent this end of the leaf spring from accidentally passing out of the opening 136. In assembled relation, the leaf spring 124 biases the pushing lever until the spacing flange 132 contacts the sliding main plate 104 to limit further pivoting movement in that direction. At the same time, the flange 132 keeps flange 126 of spring 124 in spaced relation to the sliding main plate 104 to avoid any interference with its biasing function.

The brackets 114 are mounted on the top surface of the sliding main plate in side-by-side parallel relationship, see FIG. 4, and a pushing lever 128 is pivotally mounted in each of these brackets. As seen, a few of the pushing levers have been omitted in FIG. 4 to better illustrate the relationship of the parts, but in assembled relation, a pushing lever would be mounted on the sliding main plate 104 in each bracket. Each pushing lever 128 is in alignment with one of the coin slides 64 on the coin tube assembly 22, and for reasons to become apparent below, they may be designated by the symbols a, b, c, d, e, f, g, and h, to indicate that they are associated with the columns of coin tubes described by the same symbols. As seen in FIG. 3, the effect of the leaf spring 124 is to bias the pushing lever 128 so flange 130 is normally above the flange 68 on the coin slide 64.

As stated above, the sliding main plate is mounted for horizontal movement on the support 12, and since the pushing levers are also mounted on the sliding main plate, they move along with it. So long as these pushing levers are in the position shown in FIGS. 3 and 9, the horizontal movement of the main plate 104 to its second position, see FIG. 10, will have no effect on the coin slides 64. If, however, one or more of the pushing levers 128 could be pivoted from the position shown in FIG. 9 to the position shown in FIG. 10, and held in that position against the resistance offered by the leaf spring 124, while the sliding main plate is moved toward its second position, the flanges 130 of these pushing levers would move into the path of the flanges 68 on the corresponding coin slides, so that these coin slides would be forced from their first position to their second position. This displacement of one of the coin slides 64 may be seen by comparing its position in FIGS. 9 and 10.

The movement of the sliding main plate 104 from its second position back to its first position, to complete its cycle, returns the coin slides 64 which were pushed to their second position, back to their first position. This is accomplished by means of a rake member 138. As seen in FIG. 4, this rake member is horizontally disposed and extends the width of the sliding main plate in parallel relationship to the flages 68 of the coin slides 64. The rake member 138 is rigidly secured to the sliding main plate 104 and is movable therewith, see the side support members 140 connecting it to the side of the sliding main plate in FIGS. 2 and 4.

As seen in FIGS. 9 and 10, in assembled relation, the rake member is disposed on the side of the coin slide flange 68 opposite from the flanges 130 on the pushing levers. Consequently when the sliding main plate 104 moves from its first position to its second position, the rake 138 moving in the same direction will have no effect on the coin slides 64. The coin slides which are displaced by the pivoted pushing levers 128 will be moved to the position shown in FIG. 10. Then, if the sliding main plate 104 is moved back to its first position as shown in FIG. 9, the rake 138, moving back with the main plate 104, will engage flange 68 on all the coin slides which were moved to their second position, and will force them back to their first position. This movement of the coin slides 64 from their first position to their second position and back again, permits the necessary coins in the coin tube assembly to be returned as change, as described below.

As stated above, with coins in the coin tube assembly, as shown in FIG. 17, a displacement of a maximum of five different coin slides through a complete cycle is all that is necessary to return any amount of change up to one dollar. This means that to actuate the required coin slides, as described in this particular embodiment, it is only necessary to pivot the corresponding associated pushing levers, as shown in FIG. 10, and then move the sliding main plate 104 through its cycle as described above.

Figure 6:
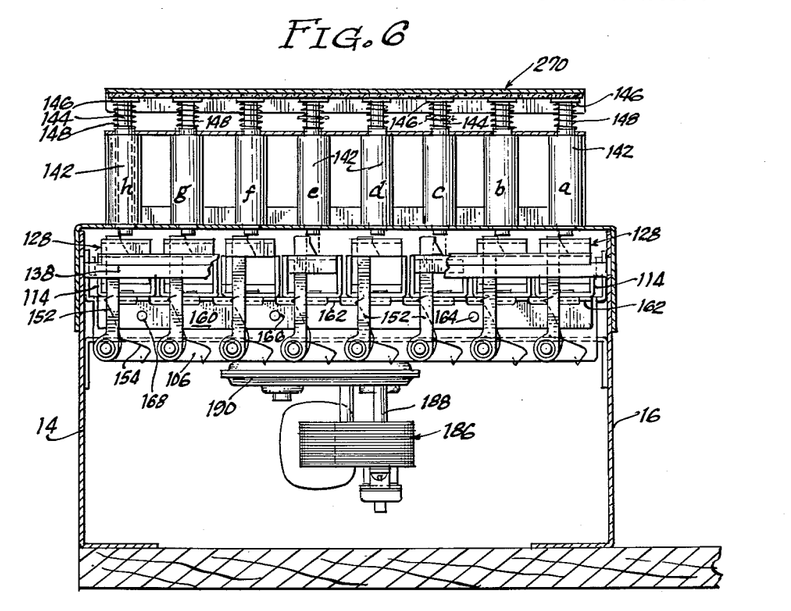
FIG. 6 is a sectional view taken on the line 6—6 of FIG. 3.
Figure 11:
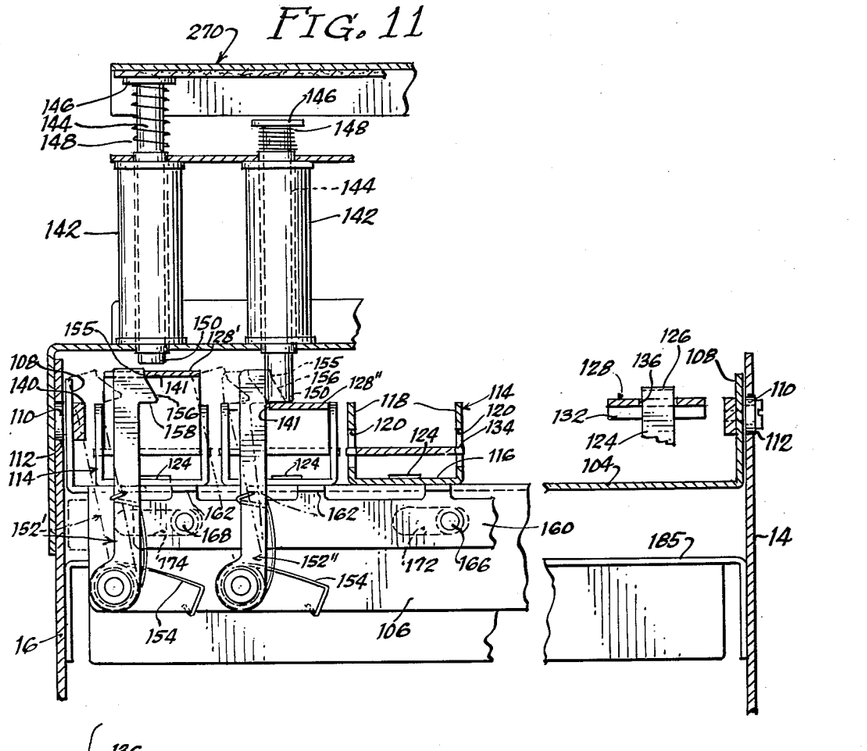
FIG. 11 is a sectional view taken on the line 11—11 of FIG. 9.

An actuating solenoid 142 is mounted above each pushing lever 128, see FIG. 6, and since each actuating solenoid is associated with a particular column of coin tubes, they too may be designated by the symbols a, b, c, d, e, f, g, and h. A push rod 144 extends through the core of each solenoid, see FIG. 11. This push rod is secured to a collar 146 at its upper end, and a coil spring 148, surrounding the push rod and coaxial therewith, is positioned between the collar 146 and the top of the solenoid, as shown in FIG. 11. The coil spring 148 biases its push rod 144 upwardly as shown. When the solenoid is energized, the push rod 144 is drawn into the coil so that its lower end 150 moves downward as shown in dotted lines in FIG. 9. This compresses coil spring 148, so that when the solenoid is de-energized, the push rod is automatically returned to its initial position.

As seen in FIG. 9, when the solenoids are not energized, the lower end 150 of each of the push rods is positioned just above the rear portion 139 of the pushing lever, adjacent flange 130. When the solenoid 142 is energized, the lower end 150 of the push rod engages portion 139 of the pushing lever 128 and they both move to the positions shown in dotted lines. As described below, the energizing impulse to the solenoid is of short duration, and it is necessary to hold the pushing lever 128 in the pivoted position shown in FIG. 10 after the push rods 144 have returned to their normal position.

This has been done mechanically in this particular embodiment by providing pawls 152 for each pushing lever. As seen in FIGS. 9 and 10, these pawls are pivotally mounted on the depending support flange 106 of the sliding main plate 104. A spring 154 is secured to the lower edge 107 of this flange 106 and to the shank of each of the pawls to bias them in the clockwise direction, see FIG. 6. As seen in FIG. 11, the upper ends of the pawls 152 are provided with a vertical positioning edge 155 which develops into a downwardly inclined cam edge 156. This downwardly inclined cam edge terminates in a horizontal hook edge 158. As seen in FIG. 12, the pushing levers 128 are provided with a hook-receiving recess 137 adjacent the push rod engaging surface 139. When the pushing levers are in the position shown in FIG. 9 and as shown by pushing lever 128' in FIG. 11, the coil springs 154 bias the pawls so their vertical positioning edge 155 is in engagement with edge 141 in the recess 137 of the pushing lever, see pawl 152' in FIG. 11. In this position the pawls 152 are substantially vertical and parallel to each other, see FIG. 6.

When, however, an actuating solenoid 142 is energized, the lower end 150 of its push rod 144 moves into engagement with portion 139 of the pushing lever, pivoting it to the position shown in FIG. 10. As this happens, the edge 141 of the pushing lever adjacent recess 137 moves down on the cam edge 156 of the pawl, pivoting it in the direction indicated by the dotted line pawl outline in FIG. 11 and against the resistance offered by the biasing spring 154. When edge 141 passes under the lower end of the pawl cam edge 156, the pawl 152 biased by spring 154 can pivot back to a substantially vertical position with the lower horizontal hook edge 158 overlapping and engaging surface 139 of the pushing lever 128, as shown by pawl 152" in FIG. 11. This prevents the pushing lever 128 from returning to its initial position under the influence of the leaf spring 124, even after the actuating solenoid 142 has become de-energized.

To this point, it is apparent that to return any given amount of change it is first necessary to energize the proper solenoids. The energized solenoids pivot their associated pushing levers and these pushing levers are held in their pivoted position by means of pawls 152. Then the sliding main plate 104, including the pushing levers 128 and the pawls 152, is moved through its cycle. This causes the coin slides associated with the pivoted pushing levers to be displaced as described above. Specifically, for a 43¢ sale, when a dollar bill is inserted in the machine, 57¢ must be returned. To do this, actuating solenoids $a$, $e$, and $f$ or $g$ must be energized, because these solenoids are associated with the coin tube columns designated by the same symbols. Then the sliding main plate is moved through its cycle as described above.

It is noted that the function of the actuating solenoids 142, the pushing levers 128, the sliding main plate 104, etc., is only to move the corresponding coin slides through their cycle, and it is apparent that mechanisms other than those described in this case may be used and are contemplated and the claims should be construed accordingly.

Once the pushing levers 128 have been pivoted and locked in their pivoted position, and after the required amount of change has been returned, each of the pushing levers 128 must be released from their locking engagement with the pawls 152 and returned to their initial position. To do this a mechanism has been provided for pivoting all the pawls in the counter-clockwise direction, looking at FIG. 11. This unhooks the pushing levers from the pawls so that the leaf springs 124 connected to the pushing levers are free to pivot them back to their initial position, as shown by the pushing lever 128' in FIG. 11.

This mechanism, as seen in FIG. 5, includes an elongated reset bar 160 extending the width of the main slide plate 104. This bar is provided with a plurality of horizontally extending fingers 162 which are transverse to the bar and are in spaced parallel relation to each other. The bar also includes three integrally attached guide pins 164, 166, and 168 which extend in a direction opposite to that of the fingers 162. These guide pins extend through three spaced guide slots 170, 172, and 174, formed in support flange 106 of the sliding main plate, and they permit the bar 160 to be displaced horizontally on this flange, see FIGS. 5 and 11.

Anchor pins 176 and 178 are rigidly secured to the opposite sides of flange 106 and extend out horizontally as seen in FIG. 5. One coil spring 180 is secured at one end to guide pin 164 and at the other end to anchor pin 176, while another coil spring 182 is secured at one end to guide pin 168 and at the other end to anchor pin 178. This arrangement biases the elongated reset bar 160 to the left as seen in FIG. 5.

Each of the fingers 162 of the reset bar 160 is positioned between the pawls 152, and the length of the slots 170, 172, and 174 is such that it permits the fingers 162 to be displaced into contact with the shank of the pawls to pivot the pawls sufficiently to free the locked pushing levers 128. This displacement of reset bar 160 and fingers 162 is shown in dotted lines in FIG. 11, and the intersection of the fingers 162 with the shank of the pawl 152 is evident in FIGS. 9 and 10. In particular, the dotted line outline of the pawl 152" and finger 162 in FIG. 11 clearly shows that when the reset bar 160 is shifted against the resistance of the coil springs 180 and 182, the engagement of the fingers 162 with the pawls 152 pivots all the pawls enough so their hooking edge 158 clears edge 141 on the pushing levers 128.

In summary to this point, after one or more pushing levers 128 have been pivoted and held in the pivoted position by means of the pawls 152, and after the proper amount of change has been returned, all the pushing levers can be simultaneously released and permitted to return to their rest position by simply shifting the elongated reset bar 160 against the resistance offered by the coil springs 180 and 182. This arrangement may be described as a mechanical reset mechanism, and it is evident and it is contemplated that the reset may be done by other means, as for example electrically, and the claims should be construed accordingly. The pushing levers 128, the brackets 114, the pawls 152, and the reset bar 160 are all mounted on the sliding main plate and form a complete subassembly 105 which can be removed as a unit from the change machine for ease in servicing.

As described above, once the proper solenoids 142 have been actuated and the corresponding pushing levers pivoted, the sliding main plate 104 must be moved through its cycle. The mechanism for doing this, as seen in FIG. 3, comprises a fixed horizontal support plate 185 connected between the vertical support plates 14 and 16 by means of screws. A first electric motor 186 is supported below this support plate by any conventional means. The shaft 188 of this motor is vertical and is adapted to be connected to a conventional gear assembly 190 for reducing the speed of the motor. The armature of the motor (not shown) is integral with the shaft and is disposed beneath the core 187 of the motor 186 when the motor is not operating. In this position, the top end of the shaft 188 is disconnected from the gear assembly. When the motor 186 is energized, its magnetic field draws the armature up into the core 187 and consequently raises the top end of the motor shaft 188 into a driving engagement with the gear assembly 190 in a manner well known in the art. This arrangement is used to eliminate the effect of the momentum of the motor on the change-making mechanism when the power to the motor is cut off, because at that time the rotating motor shaft 188 will fall out of engagement with the gear assembly 190, and its momentum will have no further effect on the change-making mechanism.

The output of the gear assembly 190 is connected to a horizontally disposed driving gear 192 which is mounted above support plate 185 and just below the sliding main plate 104. The driving gear 192 with the idler gear 193 drives horizontally disposed propelling gears 194 and 196 which are also mounted on the support plate 185, see FIG. 5. These propelling gears rotate in the directions indicated by the arrows. Driving pins 198 and 200 are rigidly secured to the top surface of the propelling gears in upstanding relationship, see FIGS. 5, 9, and 10. These pins extend through two spaced co-linear slots 202 and 204 formed in the horizontal surface of the sliding main plate 104, see FIG. 4. When the motor 186 drives gear 192, the rotation of gears 194 and 196 in the manner shown, forces the driving pins 198 and 200 against the edge of slots 202 and 204 which is nearest to the flange 106, and this forces the main plate 104 to move toward the coin tube assembly. The effect of these driving pins on the sliding main plate can be seen by comparing their positions in FIGS. 9 and 10.

Continued rotation of the propelling gears 194 and 196 would cause the sliding main plate 104 to move a fixed distance toward the coin tube assembly 22, and thereafter it would move away from the coin tube assembly back to its initial position to complete its cycle. This movement is what was initially desired to cause the pushing levers 128 and the rake 138 to move the coin slides 64 through their cycle.

Each time the change-making machine returns change for a sale, the sliding main plate 104, driven by the gear 192, must move through its cycle as described above. After that, it must stop its motion until another sale is made. Since the gears 194 and 196 drive the sliding main plate through a complete cycle each time they make a complete revolution, a cam 206 has been mounted on the same shaft as gear 194, see FIG. 5. A cam follower wheel rides on this cam. This cam follower wheel is mounted on one arm of a two-armed lever 210, while the other arm of this lever is adapted to engage the actuating arm 212 of a single-pole, double-throw microswitch 214. The cam 206 is provided with a recess 207, and after the gear 194 and cam 206 make a complete revolution, the follower wheel moves into this recess, and this causes the lever 210 to pivot, which actuates the microswitch and cuts off the current to the motor. At the same time, this disconnects the motor shaft 188 from the gear assembly 190 to prevent the momentum of the rapidly rotating motor armature from carrying the follower wheel 208 beyond the recess 207, thereby causing the motor 186 to continue its operation and drive the sliding main plate through another cycle.

The driving mechanism also provides the power to drive the mechanical reset. As seen in FIG. 5, an arm 216 is rigidly secured to gear 192 and extends radially out therefrom. This arm 216 is positioned on the gear so that as the sliding main plate 104 is moved toward the coin slides 64 by the driving pins 198 and 200 on the propelling gears, the arm 216 will move into engagement with the guide pin 166 on the reset bar 160. This displaces the reset bar 160 against the action of springs 180 and 182 and causes the pushing levers 128 to be released, as described above. The continued rotation of this arm by gear 196 finally moves it out of engagement with the guide pin 166 until it is stopped in the position shown in FIG. 5 by the action of the cam 206 and the cam follower 208 connected to the microswitch 214.

To this point, the mechanism for ejecting or returning the change has been described. It has been shown that there is an actuating solenoid 142 for each column of coin tubes and that when that solenoid is energized and the driving mechanism is actuated, one coin in each coin tube which has coin tubes therein and is in the coin tube column associated with the solenoid, will be dispensed from the machine. It has been further shown that any sum of money up to one dollar may be returned by energizing a maximum of five actuating solenoids 142 and operating the driving mechanism.

In order to use the mechanism so far described for automatically returning change for a plurality of vending machines which may sell their products at different prices, a control mechanism is necessary. One embodiment of this control mechanism, as shown in FIG. 2, includes a plurality of identical printed circuit boards, each of which is indicated generally by the reference numeral 218. These printed circuit boards are mounted in spaced parallel relationship in an assembly indicated generally by the reference numeral 219. A common shaft 220 rotatably supported in support plates 221 disposed at each end of the circuit board assembly 219, extends through the central portion of these printed circuit boards. A plurality of hubs 222 formed from some electrically non-conductive material is secured to shaft 220 by any conventional means. As shown, these hubs are disposed intermediate each of the printed circuit boards 218 for reasons to become apparent below. A two-armed rotary contact member 224 is mounted on each of these hubs by means of screws, as shown in FIG. 14.

Figure 13:
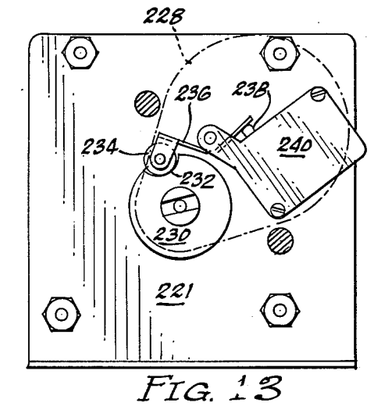
FIG. 13 is a sectional view taken on the line 13—13 of FIG. 2.

An electric motor 226 is provided for rotating the shaft 220 and all the two-armed contact members 224. This electric motor is connected to shaft 220 through a conventional speed-reducing gear assembly 228. For reasons to become apparent below, power to motor 226 must be cut off whenever the shaft 220 and the rotary contact members 224 make a complete revolution. This can be done in the same way as described in connection with gear 194 and cam 206. As seen in FIG. 13, a cam 230 is positioned on the output shaft of the speed-reducing gear assembly 228. This cam has a recess 232 formed on its periphery and a cam follower wheel 234 is positioned to ride on this cam surface. The follower wheel 234 is mounted by any conventional means on one arm of a two-armed lever 236. The other arm of this lever is associated with an actuating arm 238 of a single-pole, double-throw microswitch 240, and in such a way that once during each revolution of cam 230, when the follower wheel 234 moves into the recess 232, arm 238 actuates the microswitch and causes it to cut off the power to the motor 226.

Figure 14:
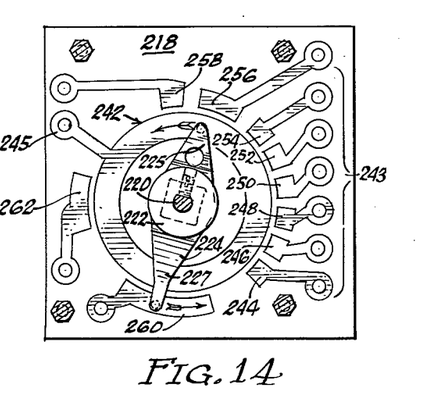
FIG. 14 is a sectional view taken on the line 14—14 of FIG. 2.

As seen in FIG. 14, each printed circuit board 218 includes a central conductive ring 242 which is electrically connected to the board connecting contact 245. As seen, arm 225 of the two-armed rotary contact 224 continuously engages this contact ring. Other contacts are concentric with the contact ring 242, in radially spaced relation thereto. These contacts include a group of six separate contacts, indicated generally by the reference numeral 243, and which comprise contacts 244, 246, 248, 250, 252, and 254. As described below, each of the contacts in group 243 is connected by means of a cable 268 to one of six contacts on a terminal board. The remaining contacts on the printed circuit board comprise contacts 256, 258, 260, and 262, and these will be described in conjunction with the operation of the circuit diagram shown in FIG. 16. It is also noted that the rotating contact members 224 are all parallel to each other so that they all engage the same electrical contacts on their corresponding printed circuit boards simultaneously.

Figure 15:
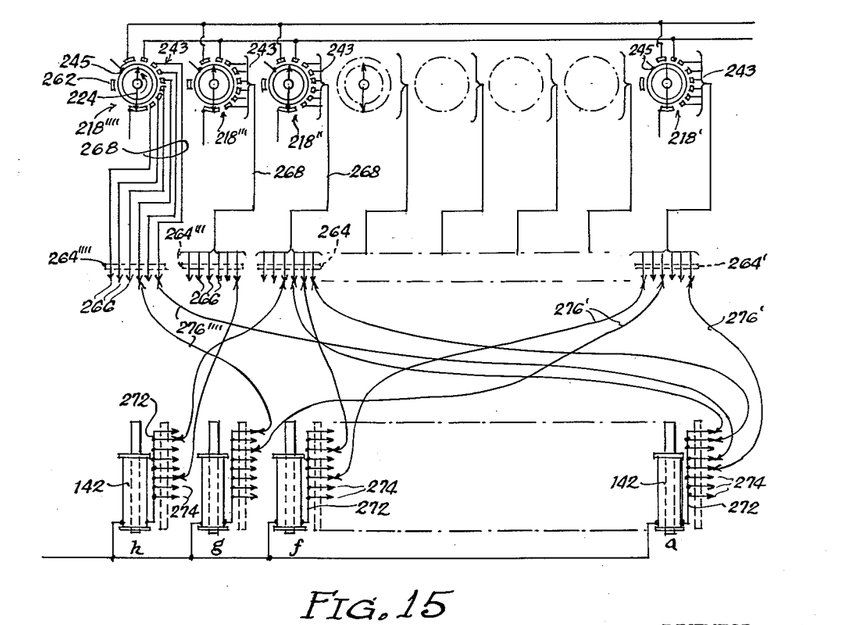
FIG. 15 is a circuit diagram showing the connection of some of the terminal on the printed circuit to the terminal contact boards associated with them, and in addition showing the connection of these associated terminal contact boards with the terminal boards connected to some of the actuating solenoids.

As seen in FIG. 15, each printed circuit board 218 is associated with a six-contact terminal board 264, and each contact in group 243 of the associated printed circuit board is connected to a separate contact 266 on this terminal board 264. With this arrangement, each contact 266 on a contact board 264 will be separately and sequentially electrically connected to contact 245 on its printed circuit board 218 when the two-armed contact 224 is rotated.

To this point, if a source of electric power is connected to terminal 245 on one particular printed circuit board 218, and if motor 226 is energized, the rotation of the rotary contact arm 224 associated with this printed circuit board would sequentially connect the power source to each contact in group 243, and consequently to each separate contact 266 on the associated contact terminal board 264.

As seen in FIG. 1, the actuating solenoids are all mounted in a common housing, indicated generally by the reference numeral 270, so that they may all be removed together as a sub-assembly to expedite servicing. On the front surface of this sub-assembly are a plurality of terminal contact boards 272, each associated with a particular actuating solenoid. Each terminal 274 on contact board 272 is connected to the associated solenoid so that the solenoid may be powered from a plurality of separate sources, as described below. As seen in FIG. 15, wires 276 with quick connect clips on each end are connected from each terminal on contact terminal board 264 to contacts on one more of the different contact boards 272.

In particular, consider the connection of wires 276' between contact terminal board 264' and the various solenoids, as shown in FIG. 15. This contact board is connected to solenoids 142 which control coin tube columns a, f, and g. If a source of power is connected to contact 245' on the printed circuit board 218', and the motor 226 is actuated, the rotation of the two-armed rotary contact member 224 would sequentially energize solenoids a, f, and g. If motor 186 is then energized, coin slides 64 controlling coin tube columns a, f, and g would be moved through their cycle causing 54¢ to be returned, assuming that the coins are disposed in the coin tubes as shown in FIG. 17. If the vending machines are set up only to receive dollar bills, this would correspond to a sale of 46¢. It is evident that the connecting wires 276 may be easily connected to other combinations of contact boards 272 so that different sums of money could be returned. In this way, by changing the amount of money returned for the dollar, the price of the merchandise sold can be varied.

Figure 16:
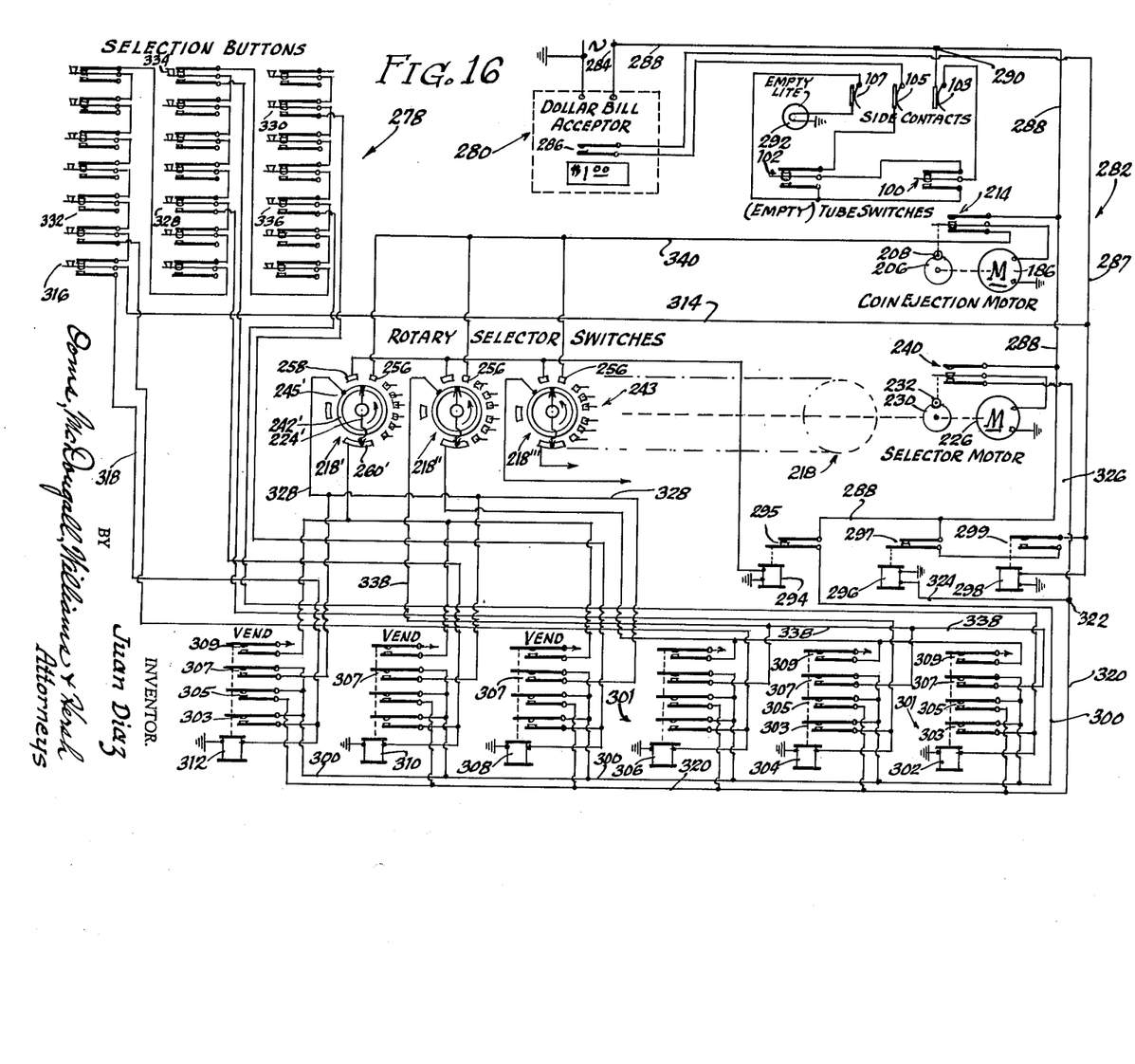
FIG. 16 is the circuit diagram for the change-making machine.

The control circuit shown in FIG. 16 is designed to return the proper amount of change for all the vending machines in a bank, in which a plurality of the vending machines may sell their products for the same price, while one or more of the other vending machines connected to the same control circuit may sell their products at different prices.

The mechanism described above is designed for use with the dollar bill acceptor as described in the copending application Serial No. 676,527, and the control circuit and the connections between the printed circuit boards 218 and the actuating solenoids 142 are designed specifically to return change for vending machines which accept only a single paper dollar as payment. It is, of course, evident that the principles of this invention could be applied to vending machines which accept coins such as a silver dollar or four quarters, or any other fixed sum of money, such as more than one dollar bill or less than one dollar, because as described above, the connections for returning change are based only on the difference between the fixed sum of money inserted in the machine and the price charged per article, and the claims should be construed accordingly.

All the vending machines used with this change-making machine are electrically operated and their selector buttons are indicated generally by the reference numeral 278, see FIG. 16. The dollar bill acceptor, indicated generally by the reference numeral 280, is powered jointly with the control circuit indicated generally by the reference numeral 282 from a common power source 284, which may be common household current. If a legitimate dollar bill is inserted in the dollar bill acceptor 280, a pair of contacts 286 close.

A power line 288 is connected at one end to power source 284. At a junction 290 in the power line, a connection is made to side contacts 103 and 105 through the microswitches 100 and 102. This connects the source of electric current to one of the contacts 286. As stated above, switches 100 and 102 are mounted on the coin tube assembly 22, and when the supply of coins in the appropriate coin tubes becomes exhausted, arm 80, see FIG. 3, extending out of the exhausted coin tube, moves into engagement with the switch bars 88 or 90, and thereby causes the central movable contact of microswitches 100 or 102 to change contact and cut off the current to contacts 286. At the same time, this change causes the empty light 292 to light up, as is apparent from a consideration of this portion of circuit 282.

Power line 288 is open when the change-making machine is not operating. As seen, it is connected to the normally closed contacts 295 of reset relay 294, and the normally closed contacts 297 of holding relay 296. In addition, power line 288 is connected to wire 300 through the normally closed contacts 295 of reset relay 294 to supply current to the holding circuits of all of the operational relays, as described below. These relays are indicated generally by the reference numeral 301 and they specifically include relays 302, 304, 306, 308, 310, and 312, in the particular embodiment shown in the drawings.

As will be described below, an operational relay 301 is provided for each separate product sold by the vending machines, and there is a selector button 278 connected to each of these operational relays to energize it. In the circuit diagram of FIG. 16, it is noted that there are only six operational relays while there are more than six selector buttons. This is because the circuit diagram 282 is designed only to illustrate the connections of the various parts of the control circuit. In actual practice there would be an unlimited number of operational relays and a corresponding number of selector buttons, one for each vending machine, see FIG. 19. As seen, each operational relay 301 has four pairs of contacts indicated as contacts 303, 305, 307, and 309.

To operate the control circuit 282, to this point, a dollar bill is inserted in the bill acceptor 280. If legitimate and if accepted, contacts 286 close, and they send an impulse into wire 287. This impulse energizes control relay 298 causing contacts 299 to close. When this happens, current from wire 288 flowing through the normally closed contacts 297 in relay 296 is connected to wire 287 through the now closed contacts 299. The result is that the contacts 297 act as part of a holding circuit so that when the impulse in wire 287 from the bill acceptor disappears, the contacts 299 of the control relay 298 will still be held closed. Consequently, current from wire 288 can now flow directly to wire 287.

A common wire 314 is connected at one end to wire 287 and at the other end to the movable center contact blade of each of the selector buttons 278 so that when relay 298 is closed, current will flow to all the selector buttons and a selection can be made. As seen, the movable blades on the selector buttons, in this particular embodiment, are all connected in series so that only one selection can be made at a time. It is noted, however, that other arrangements for doing this are possible and are contemplated, and the claims should be construed accordingly.

Assume now a dollar bill has been inserted in the money-receiving portion of the vending machine and that contacts 286 have been closed. Now suppose a specific selector button, here indicated as 316, of the group indicated generally as 278, is pressed. This selector button is associated with a particular vending machine for the purchase of a specific article. As can be seen from an inspection of the circuit diagram, once selector button 316 is actuated, current can flow through wire 318 only to operational relay 312 to energize it. When this happens, contacts 303, 305, 307, and 309 of that particular operational relay all close.

When contacts 303 of operational relay 312 close, current flowing from power line 288 through contacts 295 in reset relay 294 and on through wire 300, passes through contacts 303 and into the operational relay 312. This acts as a holding circuit, so even after selector button 316 is released, breaking its connection to wire 318, relay 312 will be held closed.

Contacts 305 are also connected to wire 300 and when they close, current from wire 300 flows through the return wire 320 to junction 322. One branch 324 leading from this junction goes to relay 296 to actuate it, while the other branch 326 goes to the selector motor 226 and starts it. When relay 296 is actuated, contacts 297 open and this cuts off the holding circuit for the control relay 298, opening contacts 299. In addition, it cuts off the current in wire 314 leading to the selector buttons 278. This means that once a selection is made, all the other selector buttons 278 automatically become de-energized, until the sale is completed.

When contacts 307 close, current from wire 300 goes to wire 328. This wire is connected to a contact 245' on a single particular printed circuit board, here indicated as 218'. Current flowing from wire 328 is connected, as seen, to terminal ring 242'. This terminal, in the position shown in the drawing, is connected by means of the two-armed rotary contact 224' to terminal 260. From there the current is returned to contacts 309 of the energized operational relay 312. These contacts lead to the vending machine associated with the selector button 316, and when contacts 309 close, a vend is made.

To recapitulate: After a dollar has been inserted in the machine and a selector button 278 is momentarily pressed, the corresponding operational relay 301 is energized and its contacts 303, 305, 307, and 309 all close. The closing of contacts 303 keeps the operational relay closed after the selector button is released. The closing of contacts 305 energizes relay 396 and cuts off the current to the other selector buttons 278, so no further selection can be made until the vend is completed and the change is returned. In addition, the closing of contacts 305 starts motor 226. The closing of contacts 307 sends current to a particular printed circuit, and the current is returned therefrom to contacts 309. The closing of contacts 309 supplies the vend impulse which operates the vending machine associated with the selector button 278, so that the product is delivered.

It is to be understood that each printed circuit in the assembly 219 corresponds to a particular price for one or more articles of merchandise. In this case, suppose as stated above, printed circuit 218' corresponds to all merchandise which sells for 46¢. This means that the selector button 316 represents one article of merchandise selling for that price. Selector buttons 328 and 330 are associated with other vending machines selling different kinds of articles. As seen by an examination of the circuit diagram 282, these selector buttons are connected to operational relays 310 and 308 respectively. When either of these operational relays is energized, their contacts 307 supply current from line 300 to wire 328 which is connected only to the printed circuit 218', so that selector buttons 316, 328, and 330 all correspond to different articles selling for the same price. As stated above, only one selector button can be operated for any particular sale, so that regardless of which of the selector buttons 316, 328, or 330 is pressed, only printed circuit board 218' will be energized. It is important to note, however, that only the operational relay corresponding to the selector button which is initially pressed will be energized, so that only the contacts 309 for the energized operational relay will close, permitting a vend to be made by the vending machine associated with the energized operational relay.

In this example, if button 316 is pressed, only the operational relay 312 will be energized, and although current will flow from contact 260' on the printed circuit board 218' to one of the contacts 309 on relays 312, 310 and 308, only the contacts 309 of relay 312 will be closed, permitting a vend of the particular product controlled by that contact. It is, of course, evident that any number of selector buttons and operational relays can be connected to each of the printed circuits. In this example, three vending machines were connected to printed circuit board 218', but any number of additional vending machines with their selector buttons and operational relays could also be connected to printed circuit board 218' for selling additional products for that price.

As seen, selector button 332 controlling operational relay 306, selector button 334 controlling operational relay 304, and selector button 336 controlling operational relay 302 are all connected by their contacts 307 to wire 338 which leads to printed circuit board 218". This printed circuit board corresponds to products selling for another price, e.g., 99c. Additional selector buttons 278 and operational relays 301 would be connected to other printed circuit boards in the same way for merchandise selling for other prices. With this arrangement any number of vending machines could be connected to a particular printed circuit, and there could be an unlimited number of printed circuits representing different prices.

Assume selector button 316 is pressed. As stated above, this causes a vend to be made of the article associated with the operational relay 312. At the same time, the printed circuit board 218' is energized and the selector motor 226 starts operating and rotates the two-armed rotary contact 224 in the direction shown by the arrows in FIG. 16. Arm 227 of this rotary contact sequentially engages contacts 244, 246, 248, 250, 252, and 254 in group 243, energizing the solenoids 142 which are connected to them through the contact terminal board 264, in this case solenoids a, f, and g, as seen in FIG. 15. The operation of these solenoids 142 causes the pushing levers 128 associated with these solenoids to be pivoted to their pushing position as described. When arm 227 engages contact 256 on the printed circuit board 218', or on any energized printed circuit board, an electric current flows temporarily through wire 340 to the single-pole, double-throw microswitch 214 associated with motor 186. As seen, this energizes the motor, causing cam 206 to rotate. This rotation of cam 206 moves the cam follower 208 out of recess 207, changing the position of the center contact of the microswitch 214 so that current from wire 288 can now flow directly to the motor 186 to keep it operating after the current from contact 256 of the printed circuit board has been cut off by the continued rotation of the rotary contact member 224. In this way microswitch 214 acts as a holding circuit for the motor 186. The operation of motor 186 moves the main plate 104 through a complete cycle as described above. The cam 206 is made so that when the cycle is over, the cam follower re-enters the recess 207 in cam 206 and breaks the holding circuit, thereby stopping the motor.

Continued rotation of the rotary contact 224 causes arm 227 to engage contact 258. As seen, this contact on each of the printed circuit boards leads to reset relay 294 and energizes it, causing contacts 295 to open. This cuts off the current in wire 300 which flows through the contacts 303 to keep the energized operational relay operating. The result is that contacts 303, 305, 307, and 309 of this relay open and the current supply to the energized printed circuit board 218 is cut off.

It is noted, however, that when the current to the energized operational relay is cut off, power is not cut off to the motors 186 or 226. Instead, they continue to operate until they make a complete revolution and their cam followers again move into the recesses in their cams, thereby opening their respective microswitches 214 or 240. As a consequence, motor 226 will continue to operate until it makes a complete revolution and returns the two-armed rotary contact switches to their initial position, as shown in FIG. 16.

As seen in FIG. 14, an extra open contact 262 is secured to each of the printed circuit boards 218. This is to provide a convenient way of controlling additional electrically operated mechanisms which may subsequently prove to be useful in association with this change-making apparatus.

There are eight contact terminal boards 264 mounted as a unit on a common support panel 265, see FIG. 1. This forms a complete sub-assembly and all the contact boards are removable as a unit for ease of servicing. This means that there must be eight printed circuit boards so that the apparatus described can return change for any number of vending machines which sell their products for eight different prices. It is evident that if it is desired to return change for products selling for more than eight different prices, it will only be necessary to add additional printed circuit boards 218 and terminal contact boards 264 and wire them in the same way as shown in FIGS. 15 and 16.

As a further example, as seen in FIG. 15, printed circuit board 218″ and its terminal contact board 264″ are connected to the contact boards 272 for solenoids 142 which control the coin tube columns $a$ and $g$. As shown in FIG. 17, this means that when the coin return mechanism is operated, 52c will be returned. Therefore, the cost of the merchandise is 48c, i.e., $1.00 minus 52c, so that printed circuit 218″ corresponds to a price of 48c and all selector buttons 278 and operational relays 301 which are connected to that printed circuit must sell their product for that price. Similarly, printed circuit 264′ is connected only to the contact board 272 of solenoid 142 which controls the coin tubes in column $h$, so that the change is 1c and the printed circuit board 218′ will control all products which sell for 99c.

It is evident that as prices change, it is very easy to change the connections between terminal contact board 264 and solenoid contact boards 272. For example, if the price of the articles which are controlled by the printed circuit board 218″ increases by 1c, the connection of the connector wire 276″ to the contact board 272 of solenoid 142 controlling the coin tubes in column $g$, would be changed to the contact board 272 associated with column $h$. If a plurality of operational relays are connected to a particular printed circuit board, and the price of only one of the articles associated with one operational relay is to be changed to a value on another printed circuit board, it is only necessary to change the connections from contacts 307 and 309 which lead to the printed circuit board corresponding to the old price and connect them to the printed circuit board corresponding to the new price.

If it is found that the supply of coins of a particular denomination are used up too rapidly, necessitating a too frequent change of the coin tube assembly, additional columns of coin tubes could be added to the coin tube assembly to increase the supply of coins of that denomination.

Figure 18:
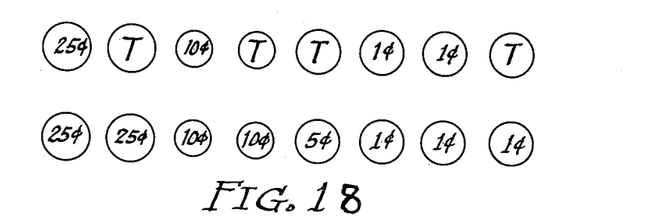
FIG. 18 shows a way that the change-making machine can also function as a vending machine.

In addition, as seen in FIG. 18, the change-making machine could also be used as a vending machine without any modification. For example, tokens indicated by the symbol T could be inserted in the normally empty coin tubes in the coin tube assembly, so that a person could purchase one or more tokens by inserting his money in the machine and receiving the tokens along with his change.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. A change-making machine for use with a bank of vending machines which contain various articles of merchandise selling for varying prices and which have a common money-receiving portion, comprising in combination a support, a coin tube assembly mounted on said support, each coin tube in the coin tube assembly adapted to hold coins of a particular denomination and having an opening to permit coins to leave the coin tube, coin-dispensing means for each coin tube movably mounted on said support and associated with said opening, each of said coin-dispensing means movable to dispense a predetermined number of coins from any coin tubes associated with it which normally contain coins, and a plurality of actuating members movably mounted on said support, each actuating member movable into engagement with one of the coin-dispensing means associated with each coin tube to cause the coin-dispensing means to move and dispense coins from those coin tubes associated with it which normally carry coins, and a separate control circuit for each different price charged for the articles sold by the vending machines, each control circuit adapted to be energized when a fixed sum of money is inserted in the said money-receiving portion and a particular article is selected from one of the vending machines in the bank which sells for the price corresponding to the price the control circuit represents, each control circuit being printed on a board and all the printed circuit boards being assembled together in spaced parallel relationship, a common shaft extending through the central portions of the printed circuit boards and rotatably mounted therein, means connected to said rotary shaft to cause it to rotate when any of the printed circuits is energized, rotary contact members rigidly mounted on the shaft, each rotary contact member associated with a particular printed circuit board, contacts mounted on each of said printed circuit boards in the path of the rotary contact member and adapted to be energized by the engagement with the rotary contact member, at least some of said contacts on each printed circuit board connected to a particular combination of actuating members and when energized causing this particular combination of actuating members to move into engagement with the associated coin-dispensing means whereby coins are dispensed from the coin tubes associated with the particular combination of coin-dispensing means selected, the connections between each control circuit and the particular combination of actuating devices such that the value of the coins dispensed equals the difference between the fixed sum of money inserted in the money-receiving portion of the change-making machine and the price of the articles selected.

2. A change-making machine for use with a bank of vending machines which contain various articles of merchandise selling for varying prices and which have a common money-receiving portion, comprising in combination a support, a coin tube assembly mounted on said support, each coin tube in the coin tube assembly adapted to hold coins of a particular denomination and having an opening to permit coins to leave the coin tube, coin-dispensing means for each coin tube movably mounted on said support and associated with said opening, each of said coin-dispensing means movable to dispense a predetermined number of coins from the coin tubes associated with it which normally contain coins, a support plate movably mounted on said support, a plurality of pushing levers, each associated with one of the coin-dispensing means in the coin tube assembly and pivotally mounted on the support plate, means associated with each of the pushing levers which when energized pivots them from a non-operative position to an operative position, motive means connected to the support plate to cause it to move in such a way that only the pushing levers pivoted to an operative position are moved into engagement with the coin-dispensing means on the coin tube assembly to cause the coin-dispensing means to dispense coins from the coin tubes associated with it which normally carry coins, and a control circuit for each different price charged for the articles sold by the vending machine, each control circuit adapted to be energized when a fixed sum of money is inserted in the said money-receiving portion and a particular article is selected from one of the vending machines in the bank which sells for a price corresponding to the price which the control circuit represents, each control circuit connected to a particular combination of said means associated with said pushing levers and when energized causes said particular combination of said means to be energized whereby the combination of associated pushing levers is first pivoted and releasably held in an operative position and the support plate is moved so that the pivoted pushing levers move into engagement with the associated dispensing means on the coin tube assembly and thereby causes coins to be dispensed, the connections between each control circuit and said particular combination of said means such that the value of the coins dispensed equals the difference between the fixed sum of money inserted in the money-receiving portion of the machine and the price of the articles selected.

3. The apparatus set forth in claim 2 including reset means for returning said pushing levers to their non-operative position and for de-energizing the energized control circuit each time a vend is made by one of the vending machines and the appropriate amount of change is dispensed from the change-making machine.

4. The apparatus set forth in claim 3 wherein each control circuit is printed on a board and all the printed circuit boards are assembled together in spaced parallel relationship, a common shaft extending through the central portions of the printed circuit boards and rotatably mounted therein, means connected to said rotary shaft to cause it to rotate when any of the printed circuits is energized, rotary contact members rigidly mounted on the shaft, each rotary contact member associated with a particular printed circuit board, contacts mounted on each of said printed circuit boards in the path of the rotary contact member and adapted to be energized by the engagement with the rotary contact member, said contacts on each printed circuit board connected to a particular combination of actuating members.

5. A mechanism for simultaneously operating selected combinations of actuating devices comprising a support plate adapted to be movably mounted on a support, a plurality of operating members, one for each actuating device, said operating members mounted on the support plate and movable between a non-operating position and an operating position, first biasing means biasing said operating members to a non-operating position, a pawl for each operating member, said pawls movably mounted on said support, second biasing means biasing each of said pawls toward an associated operating member whereby when said operating member is in an operating position the associated pawl will engage and retain said operating member in that position against the force exerted by said first biasing means, said support plate adapted to be moved so only the combination of operating members moved to an operating position will engage and simultaneously operate the selected combination of actuating devices, and a reset mechanism mounted on said support plate for engaging and moving said pawls out of engagement with said operating members in the operating position for permitting these operating members to return to their non-operating position.

6. A mechanism for simultaneously operating selected combinations of the actuating devices comprising a support plate adapted to be movably mounted on a support, said support plate having a transverse depending flange at one end, a plurality of operating levers, one for each actuating device, said operating levers mounted on said support plate in side-by-side parallel relationship, each including an actuating device contacting portion and pivotal between a non-operating position and an operating position, a first biasing means engaging each operating lever and pivoting it to a non-operating position, a pawl for each operating lever, said pawls pivotally mounted on said transverse depending flange, a second biasing means engaging each pawl and pivoting it into engagement with the side of an associated operating lever, each of said pawls having a hooking portion thereon which is positioned so that when the associated operating lever is initially pivoted to an operating position the hooking portion of the said associated pawl hooks the edge of the operating lever and retains it in the said operating position against the force exerted by said first biasing means, said support plate adapted to be moved so only the contacting portions of the combination of operating levers pivoted to the operating position will engage and simultaneously operate the selected combination of actuating devices associated with each of the operating levers pivoted to the operating position, and a reset mechanism mounted on said support plate for engaging and moving each pawl out of engagement with its associated operating lever to permit the operating levers locked in their operating position by the hooking portion of the pawls to pivot back to their non-operating position.

7. The apparatus set forth in claim 6 wherein said reset mechanism comprises a bar mounted on said transverse depending flange and movable between an operating position and a non-operating position, a third biasing means biasing said bar to a non-operating position, said bar having outwardly projecting fingers secured thereto adjacent each of said pawls, said fingers positioned so that when said bar is moved to an operating position, each of said fingers engages and pivots one of said pawls until the pawls are moved enough out of engagement with their associated operating levers to permit the hooked operating levers to pivot back to their initial non-operating position.

8. A mechanism for simultaneously operating selected combinations of actuating devices comprising a support plate adapted to be movably mounted on a support, a plurality of operating members, one for each actuating device, said operating members mounted on the support plate and movable between a non-operating position and an operating position, biasing means for biasing said operating members to a non-operating position, retaining means mounted on said support in such a way that when an operating member is in an operating position said retaining means will engage and retain the operating member in that position against the force exerted by said biasing means, said support plate adapted to be moved so only the combination of operating members moved to an operating position will engage and simultaneously operate the selected combination of actuating devices, and a reset mechanism mounted on said support plate for engaging said retaining means and moving it out of engagement with said operating members in the operating position for permitting these operating members to return to their non-operating position.

References Cited in the file of this patent

UNITED STATES PATENTS

| 465,908 | Whiteside | Dec. 29, 1891 |
| 502,242 | Travis | July 25, 1893 |
| 512,959 | Hanvey | Jan. 16, 1894 |
| 881,443 | Rosenfeld | Mar. 10, 1908 |
| 1,063,590 | Potter | June 3, 1913 |
| 1,356,379 | McDermott | Oct. 19, 1920 |
| 1,943,025 | Mangham | Jan. 9, 1934 |
| 1,961,537 | Velazquez | June 5, 1934 |
| 2,526,749 | Hokanson | Oct. 24, 1950 |
| 2,728,434 | Fry | Dec. 27, 1955 |
| 2,780,336 | Hatcher | Feb. 5, 1957 |
| 2,800,988 | Timms | July 30, 1957 |
| 2,802,473 | Keefe | Aug. 13, 1957 |
| 2,805,675 | Noyes | Sept. 10, 1957 |
| 2,876,883 | Baker | Mar. 10, 1959 |
| 2,894,612 | Care | July 14, 1959 |
| 2,895,582 | Turner | July 21, 1959 |

FOREIGN PATENTS

| 219,221 | France | Feb. 8, 1892 |